United States Patent Office 3,289,578

Patented Dec. 6, 1966

3,289,578

LITHOGRAPHIC PRINTING PLATE WITH VACUUM DEPOSITED IMAGE

Patrick F. Grosso, Stamford, Conn., assignor to Minnesota Mining and Manufacturing Company, St. Paul, Minn., a corporation of Delaware No Drawing. Filed Apr. 11, 1966, Ser. No. 541,535
6 Claims. (Cl. 101—149.2)

This invention relates to a method for printing and more particularly for a method for producing surfaces with delineated preferential receptivity for oil-based and water-based components of an immiscible oil-water system.

This application is a continuation-in-part of my prior copending application Serial No. 271,575, filed April 9, 1963, now abandoned.

Numerous methods are known for producing printing plates for the lithographic process, i.e. the process for reproduction of information by the use of areas of differential receptivity to oil-based inks and water-based dampening solutions. Modifications of the lithographic process are known wherein water-based inks and oil-based dampening solutions or inks are used.

These processes involve the production of areas upon metallic or other substrates which have preferential affinity for the ink to be used when the inverse areas are wet with an immiscible liquid, the areas being produced in the form of information, such as letters, pictures, etc.

The present invention has as its object a method for producing differentially water or oil-receptive areas upon substrates by a novel means employing vapor deposition of minute quantities of metals in vacuo upon the said substrate.

Another object of the invention is the production of lithographic printing plates by the said method. Other objects of the invention will be apparent from the disclosure hereinafter made.

It has now been found that by depositing minute amounts of certain metals upon clean substrates in vacuum systems under certain conditions, using patterns, masks, templates or other means for depositing the said metals in the predetermined pattern upon the substrate, lithographic printing plates with differential receptivity toward the selected type of ink, i.e. water-based or oil-based inks, can be produced.

In carrying out the process of the invention, the substrate sheet or block may be either receptive or non-receptive to the particular type of ink which it is desired to use for printing. Thus, if a water-based ink is to be employed for printing purposes the substrate surface may be either hydrophilic (receptive) or hydrophobic (non-receptive) to water-based ink. In either case, subsequent treatment of the material to produce areas of opposite characteristic is carried out under the proper conditions as outlined hereinafter.

Either the areas to accept the ink or the areas to reject the ink may be produced in carrying out the process of the invention, effective delineation of the image being achieved in either case. The selected substrate is placed in a vacuum coating chamber, the pressure in the chamber is reduced to a very low pressure suitable for the vaporization and deposition of metallic coatings, as of the order of $1\times10^{-4}$ to $1\times10^{-7}$ torr, and the surface of the substrate is scrupulously cleaned as by glow discharge.

If a water-receptive surface is to be produced, the reduction of pressure in the vacuum coating chamber is affected using pumps which operate without oil, that is, mercury vapor pumps, ion pumps and the like. The essential requirement is that the system be oil-free.

If an oil-receptive surface is to be produced, the reduction of pressure is effected by any useful pumping means inasmuch as the absence of oil vapors is not a criterion.

After glow discharge cleaning the substrate, an invisible, predetermined image or inverse-image is placed upon the substrate by depositing a film of metal from about 20 to 150 Angstroms in thickness. Thereafter, the substrate is removed from the coating chamber and is found to have a strongly adhered preferentially water or oil receptive pattern corresponding to the location of the area of the invisible metallic film.

Any substrate can be employed, the constituents of which have very low vapor pressure at temperatures of the order of 25—100° C., i.e. $1\times10^{-1}$–$1\times10^{-3}$, and consequently can be exposed to pressures of the order of that set forth above without formation of a surface layer of plasticizer or other constituent which would interfere with the adherence of the metallic film. The conditions under which the subsequent use of the substrate for printing is to take place will also of course aid in selecting materials of greater or less durability, dimensional stability or other physical properties. Thus, for example, paper, glass, mica sheets, synthetic resin surfaces such as polyethylene terephthalate, urea formaldehyde resins, epoxy resins, polytetrafluoroethylene, cellophane, cellulose acetate, and the like surfaces can be employed. Metallic sheets covered with films of the said resins are likewise useful, as are metallic surfaces themselves.

Metals which are useful for the purpose of producing the films which constitute the vapor deposited oil or water-receptive surfaces are such metals as nickel, chromium, and nickel-chromium alloys such as Nichrome; vanadium; tantalum, tungsten, molybdenum and the like. While these metals are highly corrosion resistant, this is not an essential criterion, particularly for surfaces not designed for long press life. As a class, the metals mentioned have high heats of sublimation, and may be termed "refractory metals."

The extremely thin film, of the order of 20–150 Angstrom units in thickness, is ordinarily invisible to visual inspection. When properly applied it is tenaciously held to the surface and is removable only vigorous mechanical cleaning.

The following examples will more specifically illustrate the process of the invention and the novel lithographic printing plates thereby produced.

*Example 1*

A porcelain plate with a flat upper surface having a glossy glaze thereon is cleaned as by chemical cleaning methods involving the use of a sodium dichromate-chromic acid cleaning solution, followed by rinsing with distilled water and wiping dry with cellulosic tissue. The plate is placed in the coating chamber of a vacuum coating apparatus. The coating apparatus is provided with a mechanical forepump and an oil diffusion pump for reduction of pressure. The coating chamber has a side arm attachment, adapted for containing a quantity of liquid, which can be connected with the coating chamber by value means when desired. In this instance, the side arm receptacle contains a small quantity, of the order of about 5 ml., of vacuum pump oil (di-2-ethylhexyl sebacate). A mask is provided in the coating chamber, above the surface of the porcelain plate, said mask having indicia cut through it. A tungsten filament having a U-shaped wire made of nichrome suspended across it is located adjacent to the mask in such a way that metallic vapor (nichrome) can pass through the cutout portions of the mask and impinge upon the surface of the glass plate when the tungsten filament is heated. The pressure in the chamber is reduced to about $5\times10^{-7}$ torr, and the surface of the plate is scrupulously cleaned by exposing it to a corona discharge for about 3 minutes, according to known methods for the purpose. Thereafter, the side arm is connected with the coating chamber, and the pressure is adjusted by heating or cooling the side arm, as required, to maintain the pressure in the coating vessel at about $1\times10^{-6}$ torr. The tungsten filament is then energized, causing the vaporization of the nichrome through the mask onto the surface of the plate until a layer approximately 50 Angstroms in thickness has been produced. The production of this thickness of metal upon the surface can be followed by mounting a transparent test plate in the system, in about the same relative location to the vaporizing nichrome as the printing plate. A light is beamed through this test plate onto a photocell, and when the transmission of the light through the glass plate has been reduced to 95 percent of its original value, the vaporization of metal is discontinued.

Upon removal of the plate from the coating chamber, and subjecting it to lithographic dampening and inking procedures, it is found that oil-soluble ink is strongly adherent but only to the areas upon which the metal has impinged. Thus the substrate is found to have an ink-receptive pattern of invisible metallic film to which is very strongly adhered some of the codeposited vacuum pump oil. This is so strongly attached that ordinary solvents cannot remove it, and is also invisible to visual inspection prior to the application of ink to the surface. Accordingly, ink can be deposited upon the receptive areas by means of a coated roller, and transferred to a paper sheet by pressing the sheet upon the surface of the ink coated plate.

*Example 2*

The procedure of Example 1 is repeated, except that an aluminum sheet previously covered with a uniform film of polychlorotrifluoroethane resin is employed as a substrate. The coating chamber is now provided with a mercury vapor pump as the sole means for reduction of pressure. The side arm is connected with a receptacle containing a small amount of water. The pressure in the coating vessel is reduced to about $1\times10^{-7}$ torr, and the surface of the plate is cleaned by electron discharge as before. The side arm is opened sufficiently to permit the escape of a small amount of water vapor into the coating chamber, and at the same time the tungsten filament is energized, vaporizing the Nichchrome. The Nichrome is deposited through the mask in the presence of the water vapor, to produce an invisible image having about 95 percent light transmission as before. Apparently, although it is of course not intended to be bound by theory, a surface with exposed hydroxyl groupings is formed.

Upon removing the plate from the coating chamber, it is found that the areas in which the nichrome has impinged are receptive to water-soluble inks, while the remainder of the area is not receptive. In this way, printing can be accomplished, using the water-soluble ink.

While, as noted, a mask can be employed for the production of indicia, other means are also useful. Such means include localized heating of the surfaces to be coated which produces selective deposition of the metallic vapor upon the cooler areas; deposition of the metal by means of an ion beam which is modulated; coating the surface with a resist which is later removed, and the like.

*Example 3*

Mechanically cleaned plates of steel, copper and alumium are further cleaned with corona discharge as set forth in Example 1, and light transmissive, substantially invisible films of tantalum, tungsten and molybdenum are coated through a mask onto the cleaned surfaces, using an electron gun for evaporation of the coating metal.

The following conditions of evaporation are used:

| Metal | Tungsten | Tantalum | Molybdenum |
|---|---|---|---|
| Acceleration potential (kv.) | 9 | 7 | 7 |
| Beam current (ma.) | 200 | 175 | 200 |
| Time (sec.) | 60 | 60 | 30 |

The coating takes place in the presence of di-2-ethylhexyl sebacate. The resulting coated metal plates are lithographically receptive to oil-based inks in the areas where the metal has been deposited.

Metallic films of the order of 20 to 150 Angstrom units in thickness are practically invisible to the eye. They are discontinuous at the lower end of the range, and consist of deposited nuclei and growth regions. These areas enlarge as deposition continues and may approach and reach continuity at the upper end, but they are in all cases light transmissive. At 20 Angstroms thickness as much as 98 to 99 percent of the incident light is transmitted, while at 150 Angstroms thickness about 80–85 percent is transmitted. The progress of deposition is most easily followed by measuring light transmission photoelectrically as shown in the specific examples herein.

What is claimed is:

1. A lithographic printing plate, consisting of a substrate of low vapor pressure having an imagewise surface deposit in predetermined areas thereof corresponding to information to be duplicated and consisting of an invisible layer of refractory metal about 20 to 150 Angstrom units in thickness and a receptivity-modifying material of the class consisting of oil and water co-deposited in vacuo, the said metallic image areas being hydrophilic and printing ink repellent when water is present and hydrophobic and printing ink receptive when oil is present.

2. A plate according to claim 1, in which the refractory metal is Nichrome.

3. A plate according to claim 1, in which the metallic deposit is ink receptive.

4. The process for the production of lithographic printing plates which comprises cleaning a substrate by glow discharge under high vacuum, and then evaporating onto the cleaned substrate only in the predetermined areas corresponding to information to be duplicated an ordinarily visually invisible film of refractory metal about 20 to 150 Angstrom units in thickness, and in the presence of a secondary film-forming material of the class consisting of oil and water.

5. A process according to claim 4, in which the refractory metal is Nichrome.

6. A process according to claim 4, in which the secondary film-forming material is water.

References Cited by the Examiner

UNITED STATES PATENTS

| | | | |
|---|---|---|---|
| 2,181,111 | 11/1939 | Horn | 101—149.2 |
| 2,732,286 | 1/1956 | Propstt. | |
| 2,760,432 | 8/1956 | Wood | 101—149.2 |

DAVID KLEIN, *Primary Examiner.*